(12) United States Patent
Honjo

(10) Patent No.: US 11,254,113 B2
(45) Date of Patent: Feb. 22, 2022

(54) LAMINATED RESIN FILM

(71) Applicant: TOPPAN PRINTING CO., LTD., Tokyo (JP)

(72) Inventor: Mika Honjo, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 127 days.

(21) Appl. No.: 15/980,492

(22) Filed: May 15, 2018

(65) Prior Publication Data
US 2018/0257353 A1      Sep. 13, 2018

Related U.S. Application Data

(63) Continuation of application No. PCT/JP2016/004048, filed on Sep. 5, 2016.

(30) Foreign Application Priority Data

Dec. 1, 2015   (JP) ............................. JP2015-234912

(51) Int. Cl.
*B32B 27/32* (2006.01)
*B32B 27/34* (2006.01)
(Continued)

(52) U.S. Cl.
CPC ............ *B32B 27/327* (2013.01); *B32B 27/08* (2013.01); *B32B 27/32* (2013.01); *B32B 27/34* (2013.01);
(Continued)

(58) Field of Classification Search
CPC ....... B32B 27/08; B32B 27/327; B32B 27/32; B32B 27/34; B32B 2250/05; B32B 2307/7244; B32B 2553/00; B32B 2307/72; B32B 2377/00; B32B 2307/538; B32B 2323/046; B32B 2307/746; B32B 2307/514; B32B 2307/732; B32B 2250/24; B65D 65/40

See application file for complete search history.

(56) References Cited

FOREIGN PATENT DOCUMENTS

| CN | 206416610 U | 8/2017 |
| JP | H09-39171 A | 2/1997 |

(Continued)

OTHER PUBLICATIONS

International Search Report with English language translation and Written Opinion issued in International Application No. PCT/JP2016/004048 dated Nov. 22, 2016.

(Continued)

*Primary Examiner* — Samir Shah
(74) *Attorney, Agent, or Firm* — Foley & Lardner LLP

(57) ABSTRACT

An aseptic pillow packaging bag and a laminated resin film that can be preferably used to produce the packaging bag. The laminated resin film includes a center layer that has a first surface provided with an inner surface layer, and a second surface provided with an outer surface layer. In the laminated resin film, the inner surface layer is a first multilayer film made of linear low density polyethylene, including two or more films selected from C6L-LDPE and/or C8L-LDPE, the center layer is a nylon-based film, or a barrier nylon film, and the outer surface layer is formed by laminating a medium density polyethylene film onto a low density polyethylene film or a medium density polyethylene film with a nylon film interposed therebetween.

6 Claims, 1 Drawing Sheet

(51) Int. Cl.
    *B65D 65/40*         (2006.01)
    *B32B 27/08*         (2006.01)

(52) U.S. Cl.
    CPC .......... *B65D 65/40* (2013.01); *B32B 2250/05* (2013.01); *B32B 2250/24* (2013.01); *B32B 2307/514* (2013.01); *B32B 2307/538* (2013.01); *B32B 2307/72* (2013.01); *B32B 2307/7244* (2013.01); *B32B 2307/732* (2013.01); *B32B 2307/746* (2013.01); *B32B 2323/046* (2013.01); *B32B 2377/00* (2013.01); *B32B 2553/00* (2013.01)

(56) References Cited

FOREIGN PATENT DOCUMENTS

| | | |
|---|---|---|
| JP | H10-237234 A | 9/1998 |
| JP | 2003-192017 A | 7/2003 |
| JP | 2005-199514 A | 7/2005 |
| JP | 2005-206237 A | 8/2005 |
| JP | 2008-080543 A | 4/2008 |
| JP | 2012-091348 A | 5/2012 |
| WO | WO-2004/011252 A1 | 5/2004 |

OTHER PUBLICATIONS

Chinese Office Action dated Jul. 23, 2019 in corresponding App. No. 2016108997794 (14 pages).

LAMINATED RESIN FILM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/004048, filed on Sep. 5, 2016, which is based upon and claims the benefit of priority to Japan Priority Application No. 2015-234912, filed on Dec. 1, 2015, the disclosures of which are all hereby incorporated herein by reference in their entireties.

TECHNICAL FIELD

The present invention relates to a laminated resin film constituting a pillow packaging body and a pillow packaging bag constituted by the film.

BACKGROUND ART

A resin film exhibits diverse properties depending on types and percentage of monomers constituting the resin and methods of production. In order to obtain properties suitable for desired use, it is effective to have a laminated resin film in which more than one type of resin is combined and laminated, and various laminated resin films have been proposed (PTLs 1 to 4). As an example of a laminated resin film constituting an aseptic pillow packaging body, a laminated resin film made of metallocene-based HDPE (40 μm)/barrier nylon (18 μm)/L-LDPE (80 μm) is widely used. Moreover, PTL 5 proposes a laminated resin film made of L-LDPE/barrier nylon/(L-LDPE/nylon/HDPE) and an aseptic pillow packaging bag using the film, which can be preferably used to hold a large amount of flowable goods.

CITATION LIST

Patent Literature

[PTL 1] JP H09-39171 A; [PTL 2] JP H10-237234 A; [PTL 3] JP 2003-192017 A; [PTL 4] JP 2005-199514 A; [PTL 5] JP 2012-091348 A

SUMMARY OF THE INVENTION

Technical Problem

The aseptic pillow packaging bag using the laminated resin film proposed in PTL 5 is less likely to develop damage from vibration during transportation and the like when a large amount of flowable goods are held. However, the aseptic pillow packaging bag has a high coefficient of friction at the surface layer. When a pillow packaging bag formed of such film is filled with goods having heavy weight by using a filling machine, vibration is generated at a sailor-collar-shaped portion. As a result, there is a risk of generating packaging defects. Therefore, there has been a demand for a laminated resin film having good slipperiness, (i.e., having low coefficient of friction) and very good suitability for filling machines, while retaining a function of being suitable for holding a large amount of goods having high fluidity, and an aseptic pillow packaging bag using the film.

Solution to Problem

The inventor of the present invention made intensive studies and found that the problem mentioned above can be solved by selecting the types of resins constituting the laminated resin film and the sequential order of lamination, and completed the present invention.

The present invention provides a laminated resin film including a center layer that has a first surface provided with an outer surface layer is formed, and a second surface provided with an inner surface layer, wherein the inner surface layer is a first multilayer film made of linear polyethylene, formed by laminating two or more films selected from the following (a) and/or (b): (a) a film made of linear low density polyethylene containing 1-hexene as a monomer component and obtained by polymerization in the presence of a metallocene catalyst; (b) a film made of linear low density polyethylene containing 1-octene as a monomer component and obtained by polymerization in the presence of a metallocene catalyst, the center layer is either at least one nylon-based film, or a barrier nylon film including at least one nylon-based film and a barrier layer, and the outer surface layer is a second multilayer film formed by laminating a medium density polyethylene film onto a first film with a nylon film interposed therebetween, the first film being a low density polyethylene film or a medium density polyethylene film, the second multilayer film being arranged with the first film side surface facing the center layer.

The second multilayer film constituting the outer surface layer preferably has a total thickness in the range of 40 μm or more to 80 μm or less. Among the low density polyethylene film, the nylon film, and the medium density polyethylene film constituting the second multilayer film, the thickest film is preferably twice or less times thicker than the thinnest film.

The barrier layer may be made of one, or two or more layer(s) selected from an MXD nylon film layer, ethylene-vinyl alcohol copolymer layer, polyvinylidene chloride layer, and silica layer.

It is preferred that the laminated resin film further includes a stretched nylon layer that has a thickness of 15 μm or more as an intermediate layer.

The present invention further provides an aseptic pillow packaging bag formed of a resin laminated film, wherein the resin laminated film includes a center layer that has a first surface provided with an outer surface layer, and a second surface provided with an inner surface layer, wherein the inner surface layer is a first multilayer film made of linear low density polyethylene, and including two or more films selected from the following (a) and/or (b): (a) a film made of linear low density polyethylene containing 1-hexene as a monomer component and obtained by polymerization in the presence of a metallocene catalyst; (b) a film made of linear low density polyethylene containing 1-octene as a monomer component and obtained by polymerization in the presence of a metallocene catalyst, the center layer is either a nylon-based film, or a barrier nylon film including a nylon-based film and a barrier layer, and the outer surface layer is a second multilayer film formed by laminating a medium density polyethylene film onto a first film with a nylon film interposed therebetween, the first film being a low density polyethylene film or a medium density polyethylene film, the second multilayer film being arranged with a first film side surface facing the center layer.

Advantageous Effects of the Invention

Use of the resin laminated film of the present invention produces an aseptic pillow packaging bag that can be preferably used to hold a large amount of flowable goods.

With good slipperiness (i.e., low coefficient of friction) of the aseptic pillow packaging bag of the present invention, vibration is less likely to be generated between the bag and a filling machine when the pillow packaging bag is filled with goods having large weight.

DESCRIPTION OF THE REPRESENTATIVE EMBODIMENTS

It is to be understood that that embodiments described below are intended to be representative of the present invention. The present invention is not necessarily limited to the representative embodiments.

Figure 1:
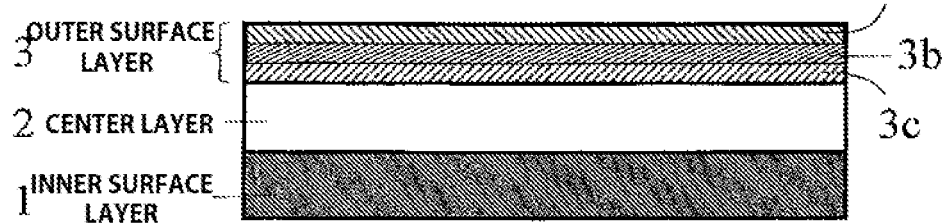
FIG. 1 is a schematic cross-sectional view of a laminated resin film of the present invention.
Figure 2:
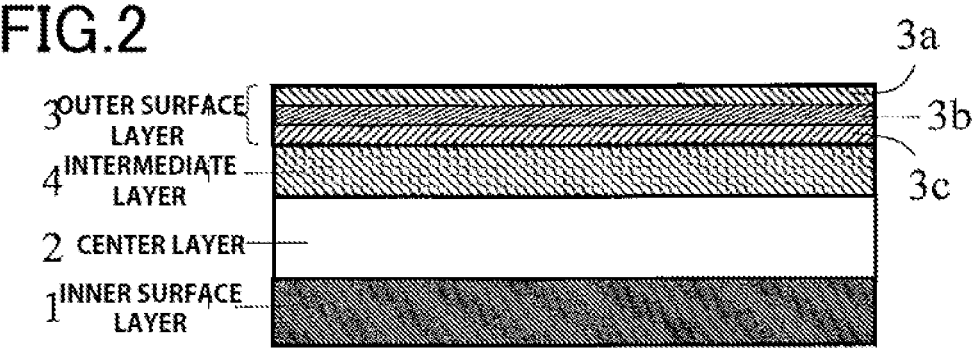
FIG. 2 is a schematic cross-sectional view of the laminated resin film of the present invention including an intermediate layer.

With reference to the drawings, the present invention is hereinafter described in detail. FIG. 1 is a schematic cross-sectional view of a laminated resin film of the present invention. The laminated resin film of the present invention includes a center layer 2 that has a first surface provided with an outer surface layer 3, and a second surface provided with an inner surface layer 1. Between the inner surface layer 1 and the center layer 2 and/or between the center layer 2 and the outer surface layer 3, a suitable intermediate layer may be laminated. FIG. 2 is a schematic cross-sectional view of the laminated resin film of the present invention further including an intermediate layer 4 between the center layer 2 and the outer surface layer 3.

Inner Surface Layer

When forming an aseptic pillow packaging bag using the resin laminated film of the present invention, the inner surface layer 1 is at the inner side of the bag. The inner surface layer is a first multilayer film made of linear low density polyethylene (which may be referred to as L-LDPE multilayer film), formed by laminating two or more linear low density polyethylene films. The linear low density polyethylene film forming the L-LDPE multilayer film is selected from a film made of linear low density polyethylene containing 1-butene as a monomer component and obtained by high pressure polymerization in the presence of a metallocene catalyst (which may be referred to as C4L-LDPE), a film made of linear low density polyethylene containing 1-hexene as a monomer component and obtained by high pressure polymerization in the presence of a metallocene catalyst (which may be referred to as C6L-LDPE), and a film made of linear low density polyethylene containing 1-octene as a monomer component and obtained by high pressure polymerization in the presence of a metallocene catalyst (which may be referred to as C8L-LDPE).

The L-LDPE multilayer film may include two or more layers, but preferably includes three or more layers (e.g., three to five layers).

The L-LDPE multilayer film may be formed by laminating more than one film of one type, or more preferably two or more types in combination, selected from C4L-LDPE, C6L-LDPE, and C8L-LDPE. It is particularly preferable to combine C6L-LDPE and C8L-LDPE. Examples of specific configurations of the L-LDPE multilayer film include C6L-LDPE/C4L-LDPE/C6L-LDPE, C8L-LDPE/C4L-LDPE/C8L-LDPE, C8L-LDPE/C8L-LDPE/C6L-LDPE, C8L-LDPE/C6L-LDPE/C6L-LDPE, C8L-LDPE/C6L-LDPE/C8L-LDPE, and C6L-LDPE/C8L-LDPE/C6L-LDPE. Among these configurations, C6L-LDPE/C8L-LDPE/C6L-LDPE is the most preferable.

The C6L-LDPE, C8L-LDPE, and C4L-LDPE may either be a non-stretched film or stretched film, but preferably is a stretched film (uniaxially stretched film or a biaxially stretched film). Use of a stretched film can also improve impact resistance.

Examples of methods of forming an L-LDPE multilayer film include co-extrusion, lamination, heat sealing, and the like.

The thickness of the L-LDPE multilayer film is selected from the ranges of, for example, 20 μm or more to 160 μm or less, and preferably 50 μm or more to 90 μm or less. The thickness and the ratio of each of C8L-LDPE, C6L-LDPE, and C4L-LDPE are not particularly limited as long as the thickness of the L-LDPE multilayer film falls within the ranges mentioned above. When the L-LDPE multilayer film is formed of C6L-LDPE, C8L-LDPE, and C6L-LDPE, a preferable ratio of the thickness therebetween is approximately 1:2:1.

The density of the L-LDPE multilayer film is preferably 0.915 g/cm$^3$ or less.

Center Layer

The center layer 2 is at least one nylon-based film. Alternatively, the center layer 2 is a barrier nylon film including a nylon-based film and a barrier layer that is provided with a nylon-based film on one of or both surfaces thereof. The thickness of the center layer 2 is selected from the range of 15 μm or more to 30 μm or less. For example, when the center layer 2 is formed of a nylon-based film, barrier layer, and nylon-based film, the ratio of the thickness therebetween is approximately 1:1:1, but is not limited thereto.

The nylon-based film may be a single layer film, or a multilayer laminated film. The multilayer laminated film may be formed by laminating the same or different types of nylons.

Examples of the nylon-based film may include films made of 6 nylon, 6,6-nylon, or MXD nylon (metaxylene diamine nylon).

Each barrier layer includes at least one layer selected from an MXD nylon film layer, ethylene-vinyl alcohol copolymer layer, polyvinylidene chloride layer, and silica layer. Instead of, or in addition to these layers, an alumina deposition layer may be used.

When the MXD nylon film layer or ethylene-vinyl alcohol copolymer layer is used as a barrier layer, the barrier layer and the nylon-based film, for example, are bonded to each other by dry lamination to obtain a barrier nylon film.

When the polyvinylidene chloride layer or silica layer is used as a barrier layer, the barrier layer can be formed by depositing the barrier layer to the nylon-based film, for example.

The barrier layer may be configured to include two or three layers by forming the ethylene-vinyl alcohol copolymer layer on the nylon-based film, followed by depositing polyvinylidene chloride and/or silica.

The barrier layer may be formed by depositing polyvinylidene chloride and/or silica on the nylon-based film, followed by forming an MXD nylon film.

The nylon-based film may be made of an easily adhesive nylon.

Oxygen transmission rate of the barrier nylon film measured by the Mocon method at room temperature (23±5° C.) is 15 cm$^3$/m$^2$/day/atm or less, preferably 5 cm$^3$/m$^2$/day/atm or less. When the oxygen transmission rate is more than 15 cm$^3$/m$^2$/day/atm, goods held in the aseptic packaging bag may be deteriorated, which is not preferable.

Outer Surface Layer

When forming an aseptic pillow packaging bag using the resin laminated film of the present invention, the outer surface layer 3 forms the outer layer of the bag. The outer surface layer is a second multilayer film formed by laminating a medium density polyethylene film 3a onto a low density polyethylene film or medium density polyethylene film 3c with a nylon film 3b interposed therebetween.

The low density polyethylene film 3c is made of low density polyethylene having a density of less than 0.915 g/cm$^3$.

For the nylon film 3b, any of well-known or common nylon films can be used. Examples of the nylon which can be used for the nylon film 3b include 6-nylon, 6,6-nylon, and MXD nylon.

Each of the medium density polyethylene films 3a and 3c may be formed of a film made of polyethylene having a density of 0.915 g/cm$^3$ or more and 0.935 g/cm$^3$ or less, and an additive such as a slip agent, anti-blocking agent or the like may be appropriately added thereto.

The outer surface layer 3 usually has a thickness in the range of 30 µm or more to 80 µm or less, preferably 40 µm or more to 80 µm or less.

The thicknesses of the low density polyethylene film or medium density polyethylene film 3c, nylon film 3b, and medium density polyethylene film 3a can be appropriately selected within the ranges mentioned above. However, among these films, the thickest film is preferably twice or less times the thicker than the thinnest film. For example, the ratio of the thickness of these films may be set to 1:1:1, 2:1:1, 1:1:2, or 1:2:1 in sequence of lamination.

As the intermediate layer 4 described above, a stretched nylon film can preferably be used. By providing the intermediate layer 4 formed of a stretched nylon film between the outer surface layer 3 and the center layer 1, the impact resistance can be improved. The stretched nylon film usually has a thickness in the range of 10 µm or more to 50 µm or less, and preferably 15 µm or more to 30 µm or less. Commercially available examples of the stretched nylon film that can preferably be used as the intermediate layer 4 include "ONMB-RT" manufactured by UNITIKA Ltd., and "NAP-22" and "NAP-42" manufactured by TOYOBO CO., Ltd.

The inner surface layer 1, center layer 2 and outer surface layer 3 may be laminated by, for example, dry lamination using an appropriate adhesive for interlayer bonding. The same applies to the case where the laminated resin film includes the intermediate layer 4. As described above, the outer surface layer 3 is laminated on the center layer 2 such that the low density polyethylene film or medium density polyethylene film 3c is at the center layer 2 side, and the medium density polyethylene film 3a is the outermost layer of the laminated resin film.

Aseptic Pillow Packaging Bag

Figure 3:
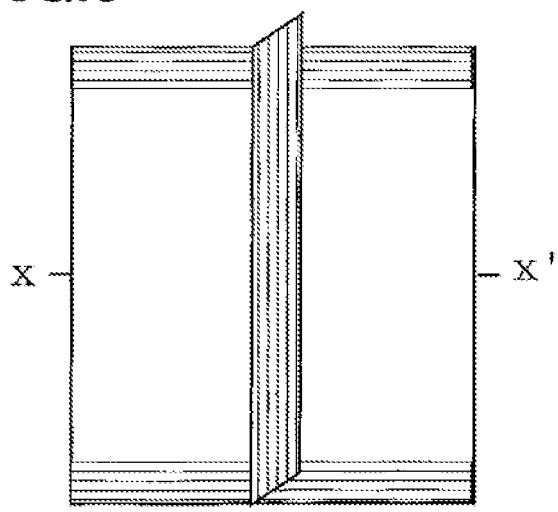
FIG. 3 is a top view of an example of an aseptic pillow packaging bag of the present invention.
Figure 4:
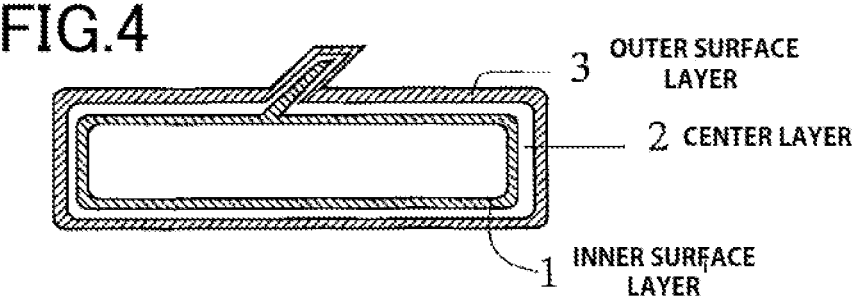
FIG. 4 is a cross-sectional view taken along the line X-X' of FIG. 3.

By using the laminated resin film described above, an aseptic pillow packaging bag suitable for holding a large amount of flowable goods can be produced. FIG. 3 is a top view of an example of the aseptic pillow packaging bag of the present invention. FIG. 4 is a schematic cross-sectional view taken along the line X-X' of FIG. 3.

As shown in FIG. 4, a pillow packaging bag is formed such that the inner surface layer 1 of the laminated resin film of the present invention is at the inner side of the bag, and the outer surface layer 3 is at the outer side of the bag.

The shape and the formation method of the pillow packaging bag can be appropriately selected from well-known or common shapes and methods, and are not particularly limited. The laminated resin film of the present invention includes the first multilayer film made of linear low density polyethylene as the inner surface layer 1. Accordingly, the pillow packaging bag can be formed by overlapping surfaces of the inner surface layer 1 so as to be in contact with each other, followed by heating and pressing for easy and reliable bonding to each other.

EXAMPLES

In the following, the present invention will be described in more detail by way of examples. However, the present invention should not be limited by the description below.

Production of Laminated Resin Film

Example 1

A laminated resin film A was formed by bonding a first multilayer film (80 µm) made of linear low density polyethylene onto a first surface of a nylon film (25 µm), and bonding a second multilayer film (40 µm) onto a second surface of the nylon film. The second multilayer film in this case was formed by laminating a medium density polyethylene film onto another medium density polyethylene film with a nylon film interposed therebetween. The first and second multilayer films were bonded by dry lamination.

Example 2

A laminated resin film B was formed in the same manner as in Example 1 except that a laminate of two nylon films (15 µm each) was used instead of the nylon film (25 µm) used in Example 1.

Comparative Example

A laminated resin film C was formed by the same manner as in Example 1 except that a different second multilayer film (40 µm) was used instead of the second multilayer film (40 µm) used in Example 1. The second multilayer film in this case was formed by laminating a high density polyethylene film on a linear low density polyethylene film with nylon film interposed therebetween. Further, in the second multilayer film, the linear low density polyethylene film was arranged facing the center layer.

Evaluation of Slipperiness

The coefficient of friction between the outer surface layer of each of the laminated resin films A to C and a metal surface was measured. The coefficient of static friction of each of the laminated resin films A and B was 0.30, and that of the laminated resin film C was 0.40. Moreover, the coefficient of kinetic friction of each of the laminated resin films A and B was 0.30, and that of the laminated resin film C was 0.42. From these results, it was found that the coefficient of friction of each of the laminated resin films A and B (Examples 1 and 2) each having a medium density polyethylene film as the outermost layer was smaller than that of the laminated resin film C (Comparative Example) having a high density polyethylene film as the outermost layer. Thus, it was confirmed that the laminated resin films A and B had improved slipperiness compared to that of the laminated resin film C.

Production of Pillow Packaging Bag

Pillow packaging bags using the laminated resin films A to C were produced using a pillow filling and packaging machine capable of producing pillow packaging bags filled with 5 liters of water. In the cases where the laminated resin films A and B were used, generation of vibration or abnormal noise at the sailor-collar-shaped portion was not confirmed. However, in the case where the laminated resin film C was used, abnormal noise caused by vibration generated at the sailor-collar-shaped portion was observed. From these results, it was confirmed that the laminated resin films A and B (Examples 1 and 2) had better filling machine suitability than that of the laminated resin film C (Comparative Example).

Evaluation of Strength

Pillow packaging bags of the laminated resin films A to C were each filled with 5 liters of water and sealed to form bag samples A to C. These samples were subjected to a drop test and a vibration test.

In the drop test, each pillow packaging bag was dropped from a height of 2 m consecutively for 50 times, and was evaluated for whether tear(s) developed. The test was conducted on 10 bag samples. Tears were not observed in any of the bag samples.

Bag samples were packed in cases, and then a vibration test equivalent to freight transportation for 2,000 km was conducted. The vibration test was conducted pursuant to random vibration testing of JIS Z 0230. Two bag samples were packed per case, being overlapped with each other. Vibration test was conducted on 10 cases. Neither tears nor pinholes were observed in any of the bag samples.

From the results of the drop tests and transportation tests, it was confirmed that the pillow packaging bags produced by using the laminated resin films A and B showed no strength deterioration compared to the pillow packaging bags produced by using the laminated resin film C.

INDUSTRIAL APPLICABILITY

According to the present invention, a large amount of flowable goods can be safely and reliably transported and stored.

REFERENCE SIGNS LIST

1 . . . Inner surface layer; 2 . . . Center layer; 3 . . . Outer surface layer; 3a . . . Medium density polyethylene film; 3b . . . Nylon-based film or barrier nylon film; 3c . . . Low density polyethylene film or medium density polyethylene film; 4 . . . Intermediate layer.

What is claimed is:

1. A laminated resin film, comprising
   (a) a center layer having a first surface and a second surface, the center layer comprises at least one nylon film;
   (b) an inner surface layer, which is a multilayer film made of linear low density polyethylene having a density of less than 0.915 g/cm$^3$, the inner surface layer being on the first surface of the center layer; and
   (c) an outer surface layer, which is a multilayer laminate consisting of (i) a first medium density polyethylene film having a density of more than 0.915 g/cm$^3$ and less than 0.935 g/cm$^3$, (ii) a second medium density polyethylene film having a density of more than 0.915 g/cm$^3$ and less than 0.935 g/cm$^3$, and (iii) a nylon film between the first medium density polyethylene film and the second medium density polyethylene film, the second medium density polyethylene film being on the second surface of the center layer.

2. The laminated resin film of claim 1, wherein a thickness of the inner surface layer is from 50 μm to 90 μm; a thickness of the center layer is from 15 μm to 30 μm, and a thickness of the outer surface layer is from 40 μm to 80 μm.

3. The laminated resin film of claim 1, wherein the center layer consists of a single layer nylon film.

4. The laminated resin film of claim 1, wherein the center layer is a laminate of two nylon films.

5. The laminated resin film of claim 1, wherein a thickest film out of the first medium density polyethylene film, the second medium density polyethylene film and the nylon film of the outer surface layer has a thickness twice or less times than a thinnest film out of the first medium density polyethylene film, the second medium density polyethylene film and the nylon film of the outer surface layer.

6. An aseptic pillow packaging bag formed of the laminated resin film of claim 1.

* * * * *